US009985918B2

(12) United States Patent
Caliendo, Jr. et al.

(10) Patent No.: US 9,985,918 B2
(45) Date of Patent: May 29, 2018

(54) MESSAGE RECIPIENT INDICATOR

(71) Applicant: LENOVO (Singapore) PTE, LTD., New Tech Park (SG)

(72) Inventors: Neal Robert Caliendo, Jr., Raleigh, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 620 days.

(21) Appl. No.: 14/488,153

(22) Filed: Sep. 16, 2014

(65) Prior Publication Data
US 2016/0080291 A1 Mar. 17, 2016

(51) Int. Cl.
*H04L 12/58* (2006.01)
(52) U.S. Cl.
CPC ................... *H04L 51/28* (2013.01)
(58) Field of Classification Search
CPC .... G06Q 10/107; G06Q 10/10; H04L 51/043; H04L 67/306; H04L 12/5835; H04L 51/16; H04L 9/3231; H04L 29/08846; H04L 67/02; H04L 65/4015; H04L 65/403; H04L 51/04; H04L 51/32; G06F 3/011; G06F 17/30256; G06F 3/041; G06F 3/04883; G06F 3/04886; G06F 9/4443; G06F 2203/04806; G06F 3/013; G06F 3/048; G06F 3/0485; H04W 4/12; G06K 9/00221; G06K 9/00288; G06K 9/00677; G07F 17/16
See application file for complete search history.

(56) References Cited

U.S. PATENT DOCUMENTS

| 7,185,285 | B2 * | 2/2007 | Van Dok ............... G06F 3/0481 715/205 |
| 9,096,920 | B1 * | 8/2015 | Gomez ..................... C23C 4/06 |
| 2004/0128353 | A1 * | 7/2004 | Goodman ............ H04L 12/581 709/204 |

(Continued)

OTHER PUBLICATIONS

Chris Smith, "Apple has figured out how to make embarrassing misdirected texts go away", BGR.com May 15, 2014.

*Primary Examiner* — Kevin Bates
*Assistant Examiner* — Ranjan Pant
(74) *Attorney, Agent, or Firm* — Kunzler, PC

(57) ABSTRACT

For preventing messages from being sent to an unintended recipient, an apparatus for indicating a message recipient is disclosed. The apparatus may include a processor and a memory that stores code executable by the processor, including code that identifies an active messaging interface from among a plurality of messaging interfaces, identifies a correspondent associated with the active messaging interface, and temporarily provides a message recipient cue based on the identified correspondent in response to a user writing to the active messaging interface. The apparatus may remove the message recipient cue in response to expiration of a predetermined interval. The apparatus may further retrieve the visual indicator from a local database, a server, and/or the identified recipient. Additionally, the apparatus may identify the active messaging interface based on a viewing location and/or on a cursor location. A method and computer program product also perform the functions of the apparatus.

18 Claims, 7 Drawing Sheets

(56) References Cited

U.S. PATENT DOCUMENTS

| | | | | |
|---|---|---|---|---|
| 2006/0109237 A1* | 5/2006 | Morita | ............... | G06F 3/013 345/156 |
| 2006/0248150 A1* | 11/2006 | Chaar | ............... | G06F 3/0482 709/206 |
| 2007/0005754 A1* | 1/2007 | Horvitz | ............... | H04L 12/1813 709/224 |
| 2008/0114846 A1* | 5/2008 | Sano | ............... | G06Q 10/107 709/206 |
| 2009/0049140 A1* | 2/2009 | Stoddard | ............... | G06Q 10/107 709/206 |
| 2009/0128567 A1* | 5/2009 | Shuster | ............... | G06T 13/40 345/473 |
| 2012/0158629 A1* | 6/2012 | Hinckley | ............... | G06F 3/038 706/15 |
| 2013/0151629 A1* | 6/2013 | DeLuca | ............... | G06Q 10/107 709/206 |
| 2013/0254716 A1* | 9/2013 | Mishra | ............... | G06F 3/04842 715/810 |
| 2014/0013271 A1* | 1/2014 | Moore | ............... | G06F 3/0482 715/792 |
| 2014/0136987 A1* | 5/2014 | Rodriguez | ............... | H04L 51/22 715/752 |
| 2014/0232639 A1* | 8/2014 | Hayashi | ............... | G06F 3/013 345/156 |
| 2015/0089394 A1* | 3/2015 | Chen | ............... | H04N 7/142 715/753 |
| 2016/0132990 A1* | 5/2016 | Zhang | ............... | H04W 4/18 345/646 |
| 2017/0163866 A1* | 6/2017 | Johnson | ............... | H04N 5/23203 |

* cited by examiner

MESSAGE RECIPIENT INDICATOR

FIELD

The subject matter disclosed herein relates to electronic communications and more particularly relates to indicating a message recipient in a communication environment.

BACKGROUND

Description of the Related Art

Electronic communications, such as electronic mail, chat rooms, text messaging, and the like, facilitate concurrent communication with multiple correspondents. When holding multiple simultaneous conversations, a user may inadvertently send a message to an unintended recipient. Messaging clients typically display a recipient's contact name or email address, usually in the title bar of the messaging window. However, users often send messages quickly and don't glance at the recipient's name to confirm that it is the expected person before sending the message.

BRIEF SUMMARY

An apparatus for indicating a message recipient is disclosed. A method and computer program product also perform the functions of the apparatus.

The apparatus may include a processor and a memory that stores code executable by the processor, the code comprising: code that identifies an active messaging interface from among a plurality of messaging interfaces, identifies a correspondent associated with the active messaging interface, and temporarily provides a message recipient cue based on the identified correspondent in response to a user writing to the active messaging interface. In one embodiment, identifying the active messaging interface includes identifying a messaging window corresponding to a cursor location.

In some embodiments, the apparatus also includes code that flags the active messaging interface in response to providing the message recipient cue, unflags the active messaging interface in response to the user shifting attention to another interface, and provides the message recipient cue in response to unflagging the active messaging interface. In one embodiment, providing the message recipient cue includes displaying the message recipient cue in the active messaging interface and removing the message recipient cue in response to expiration of a predetermined interval.

In certain embodiments, the apparatus also includes code that receives a visual identifier from the correspondent, wherein the message recipient cue comprises the visual identifier. The apparatus may further include code that retrieves a visual identifier from a server associated with the correspondent, wherein the message recipient cue comprises the visual identifier. Additionally, the apparatus may include code that prompts the user to locate a visual identifier associated with the correspondent, wherein the message recipient cue comprises the visual identifier and/or code that retrieves a visual identifier from a server associated with the correspondent, wherein the message recipient cue comprises the visual identifier.

In certain embodiments, the apparatus also includes code that tracks eye movement of the user, wherein identifying the active messaging interface is based on the eye movement. The apparatus may further display the message recipient cue at a viewing location based on the eye movement. The message recipient cue may be a translucent identifier including one or more of a name, a photograph, an avatar, and an address.

The method may include identifying, by use of a processor, an active messaging interface, displaying a visual indicator of a recipient associated with the active messaging interface, and removing the visual indicator in response to expiration of a predetermined interval. The visual indicator may be a translucent identifier including a name, a photograph, an avatar, and/or an address. In one embodiment, identifying the active messaging interface includes determining a messaging interface to which a user is typing.

In certain embodiments, the method also includes identifying the recipient associated with the message and retrieving a visual indicator based on the identified recipient. In one embodiment, retrieving the visual indicator includes retrieving the visual indicator from a source selected from a local database, a server, and/or the identified recipient. The method may further include removing the visual indicator in response to user indication and before expiration of the predetermined interval. Additionally, the method may include changing a characteristic of text in the active messaging interface in response to displaying the visual indicator.

In certain embodiments, the method also includes identifying a point of gaze (e.g., a viewing location) of a user, wherein the visual indicator is displayed at a location on the messaging interface based on the point of gaze. In some embodiments, the active messaging interface is a messaging interface to which a user is writing, and the method further includes determining whether the user writes to a second messaging interface, identifying a second recipient associated with the second messaging interface, providing a second visual indicator in the second messaging interface, and removing the second visual indicator in response to expiration of the predetermined interval.

The computer program product may include a computer readable storage medium that stores code executable by a processor to perform: determining whether a user writes to a particular messaging window, identifying a correspondent associated with the particular messaging window, and providing a message recipient cue at an area of the particular messaging window where message text is entered in response to the user writing to the particular messaging window, the message recipient cue being based on the identified correspondent.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
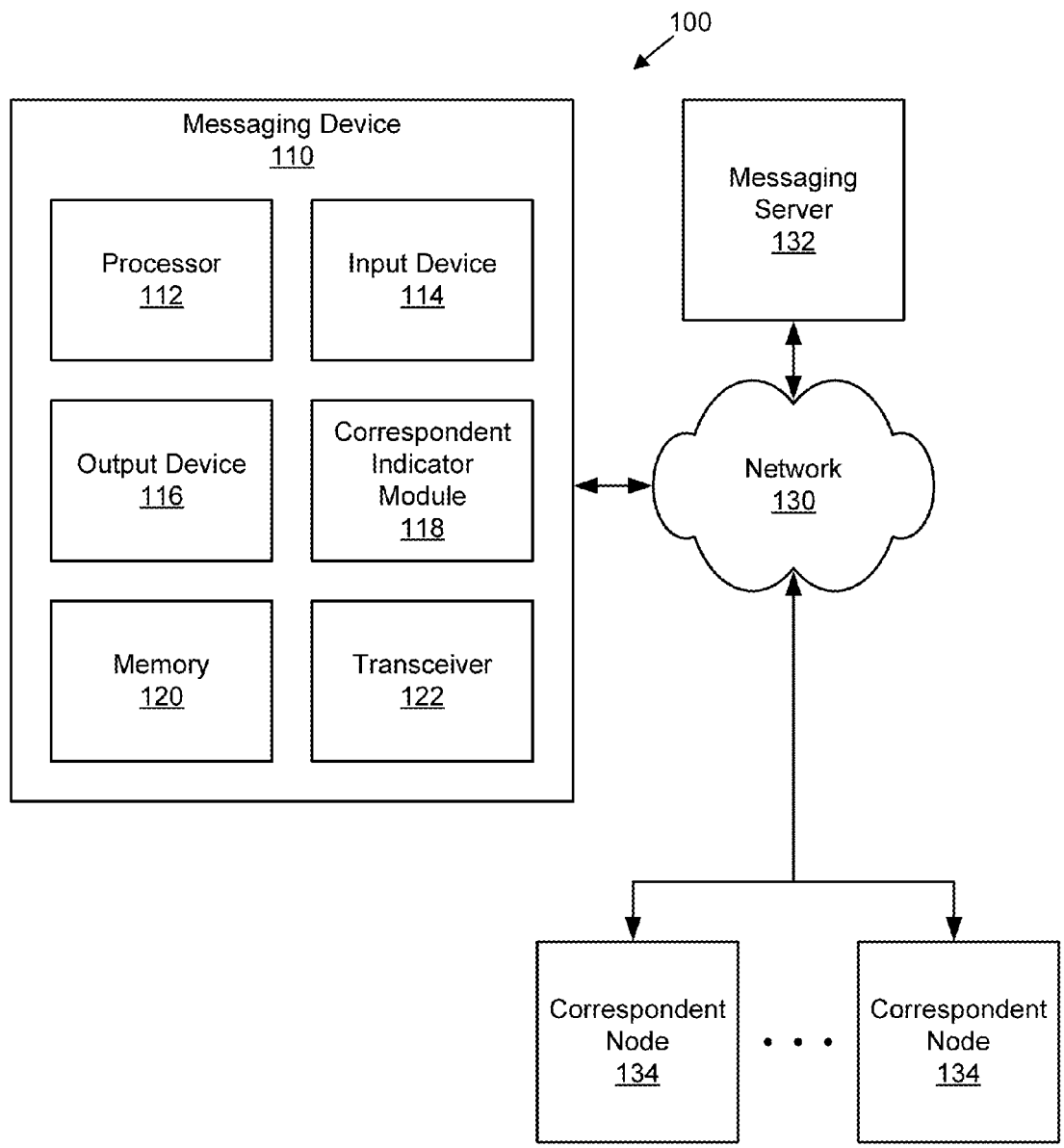
FIG. 1 is a schematic block diagram illustrating one embodiment of a system for indicating a message recipient.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the disclosed systems, apparatuses, methods, and computer program products indicate a message recipient by identifying an active message window and displaying a translucent recipient cue over the area where the message text is being entered. In some embodiments, the recipient cue is a tooltip-like window. In some embodiments, the recipient cue displays the recipient's name and/or a small photo of the recipient, for example as acquired from a contact list. The recipient cue is configured to be translucent enough not to block the content in the message window. In one embodiment, the recipient cue appears when the user starts typing the message, but then disappears after a second or two—just long enough to convey the recipient's identity to the user.

FIG. 1 depicts a system 100 for indicating a message recipient, according to embodiments of the disclosure. The system 100 includes a messaging device 110 and a plurality of correspondent nodes 134-138 communicatively coupled via a data network 130. In some embodiments, the system 100 also include a messaging server 132 that provides a messaging service among the messaging device 110 and the plurality of correspondent nodes 134-138.

The messaging device 110 comprises a processor 112, an input device 114, an output device 116, a correspondent indicator module 118, a memory 120, and a transceiver 122. In some embodiments, the messaging device 110 includes a body or an enclosure, wherein the components of the messaging device 110 are contained within the enclosure. In some embodiments, the messaging device 110 includes a power source, for example a battery or a power adapter, which provides electrical power to components of the messaging device 110. In certain embodiments, components of the messaging device 110 are communicatively coupled to each other, for example via a computer bus.

The processor 112, in one embodiment, may comprise any known controller capable of executing computer-readable instructions and/or capable of performing logical operations. For example, the processor 112 may be a microcontroller, a microprocessor, a central processing unit (CPU), a graphics processing unit (GPU), an auxiliary processing unit, a FPGA, or similar programmable controller. In some embodiments, the processor 112 executes instructions stored in the memory 120 to perform the methods and routines described herein. The processor 112 is communicatively coupled to the input device 114, the correspondent indicator module 118, the output device 116, and the memory 120.

The input device 114, in one embodiment, may comprise any known computer input device including a touch panel, a button, a keyboard, or the like. For example, the input device 114 may include a handwriting input unit operatively coupled to the processor 112. In some embodiments, the input device 114 may be integrated with the output device 116, for example, as a touchscreen or similar touch-sensitive display. In some embodiments, the input device 114 comprises a touchscreen such that text may be input by using a virtual keyboard displayed on the touchscreen and/or by handwriting on the touchscreen. In some embodiments, the input device 114 comprises two or more different devices, such as a keyboard and a touch panel.

The output device 116, in one embodiment, is configured to output visual, audible, and/or haptic signals. In some embodiments, the output device 116 includes an electronic display capable of outputting visual data to a user. For example, the output device 116 may include an LCD display, an LED display, an OLED display, a projector, or similar display device capable of outputting images, text, or the like to a user. In certain embodiments, the output device 116 includes one or more speakers for producing sound, such as an audible alert or notification. In some embodiments, the output device 116 includes one or more haptic devices for producing vibrations, motion, or other haptic feedback.

In some embodiments, all or portions of the output device 116 may be integrated with the input device 114. For example, the input device 114 and output device 116 may form a touchscreen or similar touch-sensitive display. As another example, the input device 114 and output device 116 may form a display that includes haptic response mechanisms. In other embodiments, the output device 116 may be located near the input device 114. The output device 116 may receive instructions and/or data for output from the processor 112 and/or the correspondent indicator module 118.

The correspondent indicator module 118, in one embodiment, is configured to identify an active messaging window, determine a correspondent (i.e., a message recipient) associated with the active messaging window, and present a message recipient cue in the active messaging window, the message recipient cue based on the determined correspondent. The correspondent indicator module 118 may also remove the message recipient cue after a predetermined interval such that the message recipient cue is a temporary cue. In certain embodiments, the correspondent indicator module 118 retrieves a visual identifier of the correspondent, wherein the message recipient cue is based on the visual identifier.

The correspondent indicator module 118 may be comprised of computer hardware, computer software, or a combination of both computer hardware and computer software. For example, the correspondent indicator module 118 may comprise circuitry, or a processor, configured to identify a message addressed to a group address. As another example, the correspondent indicator module 118 may comprise computer program code that allows the processor 102 to resolve the group address into a plurality of addressees, and send the message to a user-specified subset of the addressees. The correspondent indicator module 118 is discussed in further detail with reference to FIG. 2, below.

The memory 120, in one embodiment, is a computer readable storage medium. In some embodiments, the memory 120 includes volatile computer storage media. For example, the memory 120 may include a random access memory (RAM), including dynamic RAM (DRAM), synchronous dynamic RAM (SDRAM), and/or static RAM (SRAM). In some embodiments, the memory 120 includes non-volatile computer storage media. For example, the memory 120 may include a hard disk drive, a flash memory, or any other suitable non-volatile computer storage device. In some embodiments, the memory 120 includes both volatile and non-volatile computer storage media.

In some embodiments, the memory 120 stores data relating to indicating a message recipient. For example, the memory 120 may store contacts, visual identifiers, cue statuses, and the like. In some embodiments, the memory 120 also stores program code and related data, such as an operating system operating on the messaging device 110.

The transceiver 122, in one embodiment, is configured to send and to receive electronic communications via the network 130. In certain embodiments, the transceiver 122 is a wireless transceiver capable of exchanging information via electromagnetic radiation (e.g., communication via radio frequencies, infrared, visible light, and the like) or sound (e.g., ultrasonic communication). In certain embodiments, the processor 112 is a wired transceiver capable of exchanging information via a transmission line (e.g., wire, data cable, or optical fiber). In some embodiments, the transceiver 122 receives messages from the messaging server 132. In other embodiments, the transceiver 122 receives messages from one or more of the correspondent nodes 134.

The data network 130, in one embodiment, is a telecommunications network configured to allow the messaging device 110, the messaging server 132, and/or any of the correspondent nodes 134 to pass data to each other. The network 130 may be comprised of wired data links, wireless data links, and/or a combination of wired and wireless data links. Examples of wireless data networks include, but are not limited to, a wireless cellular network, a local wireless network, such as a Wi-Fi network, a Bluetooth® network, a near-field communication (NFC) network, an ad hoc network, and/or the like. The data network 130 may include a wide area network (WAN), a storage area network (SAN), a local area network (LAN), an optical fiber network, the internet, or other digital communication network. In some embodiments, the data network 130 may include two or more networks. The data network 130 may include one or more servers, routers, switches, and/or other networking equipment. The data network 130 may also include computer readable storage media, such as a hard disk drive, an optical drive, non-volatile memory, random access memory (RAM), or the like.

The messaging server 132, in one embodiment, is a server configured to support one or more messaging services. In some embodiments, the 132 may provide an internet-based messaging service. For example, the messaging device 110 and/or the correspondent nodes 134 may access the messaging service using a web browser or the like. Examples of messaging services that may be supported by the messaging server 132 include, but are not limited to, email, short messaging service (SMS), text messaging, multimedia messaging service (MMS), instant messaging, and the like.

In some embodiments, the messaging server 132 is configured to determine a topic of a reply message and associate the reply message with a conversation thread based on the topic. For example, the messaging server 132 may receive a reply message from a messaging client, determine the topic of the reply message, associate the reply message with a conversation thread based on the topic, and send both the reply message and an indication of the associated conversation thread to a recipient messaging client. As another example, the messaging server 132 may automatically associate the reply message with a conversation thread based on the topic and then send an indication of the associated conversation thread to the sending messaging client (i.e., the messaging client where the reply message was composed). In certain embodiments, the messaging server 132 may include a contextual threading module, such as the contextual threading module 118 in order to automatically and intelligently categorizing a conversation into threads.

The correspondent nodes 134, in one embodiment, are configured to send and receive messages via the network 130. For example, each correspondent node 134 may send a message to the messaging device 110, the messaging server 132, and/or to another correspondent node 134. In some embodiments, each correspondent node 134 is a messaging device comprising a processor, a memory, and a transceiver, similar to the messaging device 110. The correspondent nodes 134 may access the network 130 via wired or wireless data links. While only two correspondent nodes 134 are depicted in FIG. 1, in other embodiments, any number of correspondent nodes 134 may be included in the system 100.

In some embodiments, multiple correspondent nodes 134 may engage in simultaneous, or near simultaneous, conversation with the messaging device 110. For example, a first correspondent nodes 134 may be engaged in an email conversation with the messaging device 110 while a second correspondent node 134 may be engaged in a second instant messaging session with the messaging device 110. In some embodiments, the messaging device 110 and a plurality of correspondent nodes 134 may be engaged in the same conversation, such as an email exchange, chat room, or the like.

Figure 2:
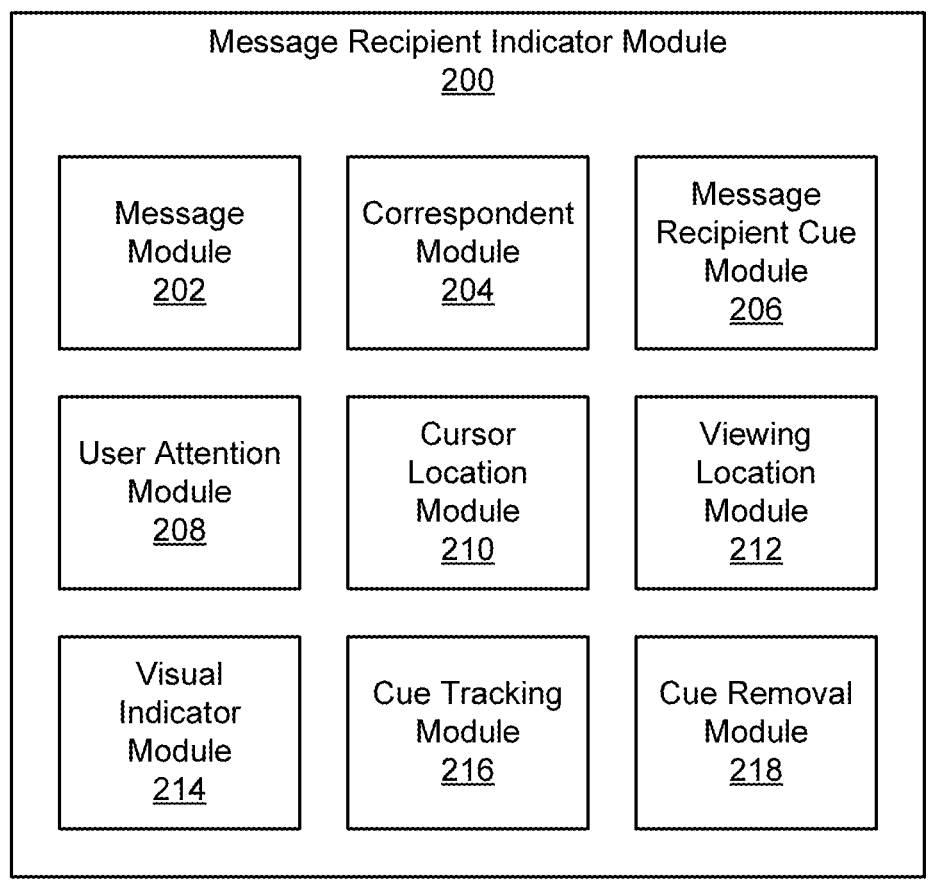
FIG. 2 is a schematic block diagram illustrating one embodiment of an apparatus for indicating a message recipient.

FIG. 2 depicts a message recipient indicator module 200 for indicating a message recipient, according to embodiments of the disclosure. In some embodiments, the message recipient indicator module 200 may be similar to, and perform the same functions as, the correspondent indicator module 118 described above with reference to FIG. 1. In some embodiments, the message recipient indicator module 200 may be part of a messaging device, such as the messaging device 110 and/or a correspondent node 134. In other embodiments, the message recipient indicator module 200 may be part of a messaging server, such as the messaging server 132 or a webmail server.

In general, as described above, the message recipient indicator module 200 identifies an active messaging window, determines a correspondent (i.e., a message recipient) associated with the active messaging window, and provides a message recipient cue in the active messaging window, the message recipient cue based on the determined correspondent. In some embodiments, the message recipient indicator module 200 may also remove the message recipient cue after a predetermined interval such that the message recipient cue is a temporary cue. In certain embodiments, the message recipient indicator module 200 retrieves a visual identifier of the correspondent, wherein the message recipient cue is based on the visual identifier.

The message recipient indicator module 200, in one embodiment, includes a message module 202, a correspondent module 204, and a message recipient cue module 206. In some embodiments, the message recipient indicator module 200 also includes one or more of a user attention module 208, a cursor location module 210, a viewing location module 212, a visual indicator module 214, a cue tracking module 216, and/or a cue removal module. The modules of the message recipient indicator module 200 may be communicatively coupled to one another.

The message module 202, in one embodiment, is configured to identify an active messaging interface from among a plurality of messaging interfaces. As used herein, an "active" messaging interface refers a messaging interface that is presently selected by the user such that text typed will be input to the active messaging interface. For example, the user may be communicating simultaneously with a plurality of correspondents using a plurality of messaging interfaces (messaging windows), wherein the "active" messaging interface is the currently selected messaging interface. In some embodiments, a plurality of messaging interfaces may be open in a graphical user interface of a messaging device, such as the messaging device 110, with the "active" messaging interface being the "top" messaging interface.

The message module 202 may identify the active messaging interface based on where the user's attention is directed. In some embodiments, the message module 202 identifies the active messaging interface based on one or more of a cursor location, a viewing location, a touch location, and a typing location. For example, the message module 202 may identify the active messaging interface by determining to which messaging interface a user is typing. In some embodiments, the message module 202 may identify when the user switches from a first messaging interface to a second messaging interface, the second messaging interface becoming the active messaging interface.

In some embodiments, the message module 202 may store a cue status for each open messaging interface. In certain embodiments, the cue status may be based on how recently the message recipient cue was displayed and/or on whether user interactions occurred at other interfaces (e.g., other messaging interfaces and/or interfaces for running applications) since the message recipient cue was last provided. In some embodiments, the cue status may indicate whether the message recipient cue should be provided.

The correspondent module 204, in one embodiment, is configured to identify a correspondent associated with the active messaging interface (e.g., the recipient of messages sent using the messaging interface). In some embodiments, the correspondent module 204 identifies a plurality of correspondents for a plurality of open messaging interfaces, each correspondent associated with one of the messaging interfaces. For example, the correspondent module 204 may identify a first correspondent associated with a first messaging interface and a second correspondent associated with a second messaging interface. In some embodiments, the correspondent is an individual, while in other embodiments the correspondent may be a group (i.e., a plurality of individuals with whom the user is conversing using a single messaging window).

In some embodiments, the correspondent module 204 retrieves a visual identifier based on the identified correspondent. Examples of the visual identifier include, but are not limited to, a photograph of the identified correspondent, an avatar associated with the identified correspondent, an icon or an image associated with the identified correspondent, a text construct that represents the identified correspondent (e.g., an image of the correspondent's name), and the like. The correspondent module 204 may provide the visual identifier to the message recipient cue module 206, wherein the message recipient cue module 206 creates the message recipient cue using the visual identifier.

In some embodiments, the correspondent module 204 retrieves the visual identifier from a user's contacts (e.g., email contact list, phone contact list, "buddy" list, or friend list) stored locally or on a remote storage device (e.g., a messaging server). In some embodiments, the correspondent module 204 receives the visual identifier from the identified correspondent, for example a correspondent's messaging client may communicate the visual identifier along with other identifiers of the correspondent. In some embodiments, the correspondent module 204 retrieves the visual identifier from a server associated with the identified correspondent, for example a messaging server used by the identified correspondent. In certain embodiments, the correspondent module 204 retrieves the visual identifier from a local data storage device, such as a primary memory device (e.g., a RAM memory) or a secondary storage device (e.g., a flash drive or disc drive). In certain embodiments, the visual identifier is loaded into memory when the messaging interface is first opened and communication established with the correspondent. The correspondent module 204 may then quickly retrieve the pre-loaded visual identifier from memory.

The message recipient cue module 206, in one embodiment, is configured to provide a message recipient cue in a messaging interface based on the identified correspondent. Generally, the message recipient cue is sized so as to be easily noticed by the user. In some embodiments, the message recipient cue fills a substantial portion of the messaging interface, for example the entire text editing portion of the messaging interface. However, the message recipient cue may also be located in the messaging interface in a manner that minimizes blocking content (i.e., messages) in the messaging interface. In some embodiments, the message recipient cue is a temporary (e.g., transient) cue that persists for a time and then disappears from the messaging interface. In some embodiments, the message recipient cue module 206 presents the message recipient cue with an initial transparency value (e.g., a first transparency level) and increases the transparency over time (e.g., at regular intervals) until a final transparency value (e.g., a second transparency level) is reached.

The message recipient cue module 206 provides (e.g., displays) the message recipient cue in response to the user directing attention to the active messaging interface. The user's directed attention may be detected by typing at the messaging interface, by moving a cursor over the messaging interface (e.g., a mouse-over), by touching a location on a touch panel (e.g., a touchscreen) corresponding to the interface, by looking at the interface (e.g., as detected by an eye tracking module), or the like. For example, the message recipient cue module 206 provides the message recipient cue in response to a user writing to the active messaging interface.

In some embodiments, the message recipient cue module 206 checks a cue status for the active messaging interface prior to providing the message recipient cue. A cue status may be associated with each messaging interface, the cue status indicating whether the message recipient cue should be provided. If the cue status indicates that the message recipient cue should be provided, then the message recipient cue module 206 displays the message recipient cue. Otherwise, if the cue status indicates that the message recipient cue should not be provided, then the message recipient cue module 206 does not display the message recipient cue. The cue status may be based on how recently the message recipient cue was displayed and/or on whether user interactions occurred at other interfaces (e.g., other messaging interfaces and/or interfaces for running applications) since the message recipient cue was last provided.

In some embodiments, the message recipient cue module 206 may display an alternative cue in response to the cue status indicating that the message recipient cue should not be provided. In certain embodiments, the alternative cue comprises an abbreviated version of the message recipient cue. In certain embodiments, the alternative cue comprises an alternative identifier of the message recipient. For example, if the message recipient cue is an image of the message recipient, the alternative cue may be the name of the message recipient.

In certain embodiments, the message recipient cue module 206 displays the message recipient cue in the active messaging interface. In some embodiments, the message recipient cue module 206 receives an onscreen location corresponding to the user's gaze (e.g., from the viewing location module 212) and displays the message recipient cue in the messaging interface at the onscreen location or, alternatively, at a portion of the messaging interface closest to the onscreen location. In some embodiments, the message recipient cue module 206 displays the message recipient cue in a portion of the messaging interface where the inputted text is displayed. For example, the message recipient cue may be displayed in a text editing portion of the messaging interface, the message recipient cue being superimposed on the most recently inputted text.

In some embodiments, the message recipient cue module 206 removes the message recipient cue in response to expiration of a predetermined interval. The predetermined interval may initiate in response to the message recipient cue module 206 providing the message recipient cue. For example, a timer may begin to count down when the message recipient cue is displayed and the message recipient cue module 206 may remove the message recipient cue when the timer reaches zero. In certain embodiments, the predetermined interval is user adjustable. In some embodiments, the message recipient cue module 206 may remove the message recipient cue in response to a user command or indication. For example, the user may select a "close" button of the message recipient cue and the message recipient cue module 206 may remove the message recipient cue responsive to the user selection. In further embodiments, the message recipient cue module 206 may remove the message recipient cue in response to user indication and before expiration of the predetermined interval.

In some embodiments, the message recipient cue is a translucent identifier of the message recipient. The identifier may be a visual indicator of a recipient associated with the active messaging interface, including one or more of a name of the recipient (e.g., a screen name, username, or personal name), an image of the recipient (e.g., a photograph), an avatar of the recipient, and an address of the recipient (e.g., an email address or a phone number). Being translucent, the message recipient cue may have a transparency value allowing the user to view the text through the message recipient cue so as to not block the content (e.g., text) of the message. For example, the message recipient cue may be a watermark displayed in the background of the messaging interface. In certain embodiments, the message recipient cue module 206 may modify a characteristic of the text in the messaging interface in response to displaying the message recipient cue. For example, the message recipient cue module 206 may adjust the color, size, and/or typeset of the text to make it more visible (e.g., high contrast) so as to be easily readable against the translucent identifier.

In some embodiments, the message recipient cue module 206 creates the message recipient cue from information in a user's contacts (e.g., email contact list, phone contact list, "buddy" list, or friend list). In certain embodiments, the message recipient cue module 206 may retrieve the contact information from a local storage device (e.g., a phone memory or a disc drive). In other embodiments, the message recipient cue module 206 may retrieve the contact information from a server, such as the messaging server 132. In certain embodiments, the message recipient cue module 206 creates the message recipient cue from information received from the message recipient, such as from the correspondent nodes 134. For example, a messaging client may publish the message recipient's (i.e., its user's) name, image, and/or address. In other embodiments, the message recipient cue module 206 creates the message recipient cue from information provided by the user. For example, the user may select a photo to be used in the message recipient cue for a particular message recipient. The message recipient cue module 206 may create the message recipient cue by formatting a received image (e.g., sizing, cropping, or adjusting color/contrast), by generating a text image from a name or address, or the like.

In some embodiments, the message recipient cue module 206 provides a plurality of message recipient cues for a plurality of messaging interfaces, each message recipient cue corresponding to an identified message recipient associated with the messaging interface. For example, the message recipient cue module 206 may provide a first message recipient cue for a first messaging interface and a second message recipient cue for a second messaging interface, the first message recipient cue based on a correspondent associated with the first messaging interface and the second message recipient cue based on a correspondent associated with the second messaging interface. When the first messaging interface becomes active, the message recipient cue module 206 may provide the first message recipient cue in the first messaging interface. Likewise, when the second messaging interface becomes active, the message recipient cue module 206 may provide the second message recipient cue in the second messaging interface. In some embodiments, the message recipient cue module 206 removes each message recipient cue in response to expiration of a predetermined interval or in response to user action. For example, if the user selects the second messaging interface while the first message recipient cue is being displayed (i.e., before expiration of the predetermined interval), then the message recipient cue module 206 may remove the first message recipient cue from the first messaging interface and provide the second message recipient cue in the second messaging interface in response to the user selection of the second messaging interface. The message recipient cue module 206 may again display the first message recipient cue in response to the user returning to the first messaging interface.

The user attention module 208, in one embodiment, is configured to determine whether the user's attention is directed to the messaging interface. In some embodiments, the user's attention may be based on eye data, touch data, cursor data, or the like. For example, the user attention module 208 may determine that the user's attention is directed to the messaging interface in response to the eye data indicating that the user is looking at the messaging interface. As a further example, the user attention module 208 may determine that the user's attention is directed to the messaging interface in response to the cursor data indicating that a mouse pointer is at rest over the messaging interface.

In some embodiments, the user attention module 208 may determine the user's attention based on user activity. For example, if the user has not typed, scrolled, or moved the cursor for a predetermined period of time, then the user attention module 208 may determine that the user is not paying attention to the messaging interface. In further embodiments, the message recipient cue module 206 may determine that the user's attention is returned to the messaging interface after a period of inactivity.

In some embodiments, the user attention module 208 may indicate to the message module 202 whether the user's attention is directed to a particular messaging interface, wherein the message module 202 identifies an active messaging interface based on the user's attention. In further embodiments, the user attention module 208 may send data regarding the user's attention to the message module 202, wherein the message module 202 determines a cue status for a messaging interface based on the user's attention.

In some embodiments, the cursor location module 210 may indicate to the message recipient cue module 206 whether the user's attention is directed to a particular messaging interface, wherein the message recipient cue module 206 removes the message recipient cue in response to the user's attention being directed away from the particular messaging interface. For example, if a user looks away from a particular messaging interface while the message recipient cue is being displayed, the cursor location module 210 may indicate the lack of user attention to the message recipient cue module 206, wherein the message recipient cue module 206 removes the message recipient cue in response to the lack of attention.

The cursor location module 210, in one embodiment, is configured to identify a cursor location on a user interface. Examples of cursor locations include, but are not limited to, a touch location (e.g., on a touchscreen), a mouse location (e.g., the location of a pointer controlled by a mouse or other pointing device), and a type location (e.g., the location of a key-controlled cursor where input text will appear). The cursor location module 210 may further determine whether the cursor location coincides with the location of one or more messaging interfaces. In some embodiments, the cursor location module 210 may also identify a particular messaging window corresponding to a cursor location.

In some embodiments, the cursor location module 210 may provide the cursor location to the message module 202, wherein the message module 202 identifies an active messaging interface based on the cursor location. For example, the cursor location module 210 may identify a mouse location, a touch location, a typing location, or the like and provide the location(s) to the message module 202 for identifying an active messaging interface. In some embodiments, the cursor location module 210 may provide the cursor location to the message recipient cue module 206, wherein the message recipient cue module 206 provides the message recipient cue at a location based on the cursor location. For example, if a user touches a particular messaging interface and begins to type, the cursor location module 210 may identify the touch location and provide the location to the message recipient cue module 206, wherein the message recipient cue module 206 displays the message recipient cue at the touch location.

The viewing location module 212, in one embodiment, is configured to determine an onscreen viewing location corresponding to a user's gaze. In some embodiments, the viewing location module 212 tracks eye movement and location to determine the onscreen viewing location. In some embodiments, the viewing location module 212 tracks facial movement and orientation to determine the onscreen viewing location. The viewing location module 212 may determine a point where the user is gazing based on, e.g., the eye data and/or face data and identify an onscreen viewing location corresponding to a user's gaze. In some embodiments, the viewing location module 212 identifies a user interface corresponding to the onscreen viewing location.

In some embodiments, the viewing location module 212 provides the onscreen viewing location to the message module 202, wherein the message module 202 identifies the active messaging interface based on the viewing location. In certain embodiments, the viewing location module 212 may provide eye movement data to the message module 202, wherein the viewing location module 212 identifies the active messaging interface based on the eye movement data. In some embodiments, the viewing location module 212 provides the onscreen viewing location to the message recipient cue module 206, wherein the message recipient cue module 206 provides the message recipient cue at a location based on the onscreen viewing location. For example, the message recipient cue module 206 may center the message recipient cue at the viewing location indicated by the viewing location module 212.

In some embodiments, the viewing location module 212 may detect when a user looks away from the active messaging interface. For example, the user may glance away from a first messaging interface to look at a second messaging interface, at the user interface of another application running on an electronic device, such as the messaging device 110, or even at an off-screen location. In certain embodiments, the viewing location module 212 may provide the onscreen viewing location to the user attention module 208, wherein the user's attention is determined based on the onscreen viewing location.

The visual identifier module 214, in one embodiment, is configured to obtain a visual identifier corresponding to the identified correspondent, wherein the message recipient cue comprises the visual identifier. Examples of the visual identifier include, but are not limited to, a photograph of the identified correspondent, an avatar associated with the identified correspondent, an icon or an image associated with the identified correspondent, a text construct that represents the identified correspondent, and the like. The visual indicator module 214 may provide the visual identifier to the message recipient cue module 206, wherein the message recipient cue module 206 creates the message recipient cue using the visual identifier.

In some embodiments, the visual indicator module 214 receives the visual identifier from the identified correspondent, for example a correspondent's messaging client may communicate the visual identifier along with other identifiers of the correspondent. In some embodiments, the visual indicator module 214 retrieves the visual identifier from a server associated with the identified correspondent, for example a messaging server used by the identified correspondent. In certain embodiments, the visual indicator module 214 retrieves the visual identifier from a local data storage device, such as a flash drive or disc drive. In further embodiments, the visual indicator module 214 may allow the user to locate a visual identifier associated with the identified correspondent. For example, the user may replace a visual identifier received from a messaging server with a locally stored picture of the identified correspondent.

The cue tracking module 216, in one embodiment, is configured to monitor for and store data regarding when a message recipient cue is provided for a messaging interface. In some embodiments, the cue tracking module 216 stores a flag associated with a particular messaging interface in response to the message recipient cue module 206 providing the message recipient cue. For example, the cue tracking module 216 may determine that the user types to a first messaging interface and that a message recipient cue is provided for the first messaging interface. The cue tracking module 216 may then flag the first messaging interface as having recently provided the message recipient cue. In certain embodiments, the message recipient cue module 206 may check for the presence of the flag and may provide the message recipient cue only when the flag is not present.

In certain embodiments, the cue tracking module 216 removes a flag associated with a messaging interface after a renewal time period and/or in response to a period of inactivity exceeding a renewal threshold. For example, the cue tracking module 216 may detect a lack of activity for a first messaging interface and may remove the flag. The renewal time period and/or the renewal threshold may be selected by the user, by a vendor of the message recipient indicator module 200, or by a manufacturer of the message recipient indicator module 200. In certain embodiments, the cue tracking module 216 removes a flag associated with a first messaging interface in response to the user selecting (or writing to) a second messaging interface.

In some embodiments, the cue tracking module 216 adjusts a cue status for the active messaging interface. As discussed above, a cue status may be associated with each messaging interface, the cue status indicating whether the message recipient cue should be provided. The cue status may be based on how recently the message recipient cue was displayed and/or on whether user interactions occurred at other interfaces (e.g., other messaging interfaces and/or interfaces for running applications) since the message recipient cue was last provided. For example, the cue status may be reset after a messaging interface (e.g., messaging window) is no longer active (e.g., on top). The cue tracking module 216 may adjust the cue status based on the stored data regarding when a message recipient cue is provided for a messaging interface. In some embodiments, the cue status is based on the flag associated with a messaging interface.

The cue removal module 218, in one embodiment, is configured to remove the message recipient cue from the display. In some embodiments, the cue removal module 218 removes the message recipient cue in response to expiration of a time interval. For example, the cue removal module 218 may activate a timer in response to the message recipient cue module 206 presenting the message recipient cue and may remove the message recipient cue when the timer expires. In certain embodiments, the time interval may be set and/or adjusted by a user.

In some embodiments, the cue removal module 218 removes the message recipient cue in response to a user indication, such as a key press, a button press, a gesture, or the like. For example, a "close" button may be provided adjacent to the message recipient cue and the cue removal module 218 may remove the message recipient cue in response to the user selecting the "close" button. As another example, the cue removal module 218 may monitor for a particular gesture, such as a swipe, and may remove the message recipient cue in response to detecting the particular gesture.

In certain embodiments, the cue removal module 218 may remove the message recipient cue prior to expiration of the time interval and in response to a user action. In some embodiments, the cue removal module 218 may remove the message recipient cue if the user sends the message or selects another messaging interface prior to expiration of the time interval. For example, the user may be composing a message for a first conversation (e.g., in a first messaging interface) when a message is received for a second conversation (e.g., in a second messaging interface). The user may begin composing a reply for the second conversation before completing the message for the first conversation. Accordingly, the cue removal module 218 may detect when the user leaves the first messaging interface (e.g., by selecting the second messaging interface) and remove a message recipient cue associated with the first conversation even though the time interval has not expired.

FIGS. 3A-3D depict a user interface 300 for a messaging device, according to embodiments of the disclosure. In some embodiments, the messaging device may be similar to the messaging device 110, the correspondent indicator module 118, and/or the message recipient indicator module 200 described above with reference to FIGS. 1 and 2. The messaging device, in one embodiment, identifies an active messaging window, identifies a correspondent (i.e., a message recipient) associated with the active messaging window, displays a message recipient cue in the active messaging window based on the correspondent, and removes the message recipient cue after a predetermined interval.

The user interface 300, in one embodiment, includes a first messaging window 302 and a second messaging window 310. In some embodiments, the first messaging window 302 contains a first correspondent name pane 304, a first conversation pane 306 that displays one or more messages exchanged between the user and the first correspondent, and a first message composition pane 308. In some embodiments, the second messaging window 310 contains a first correspondent name pane 312, a second conversation pane 314 that displays one or more messages exchanged between the user and the second correspondent, and a second message composition pane 316. While FIGS. 3A-3D depict the user interface 300 as having two messaging windows 302 and 310, in other embodiments the user interface 300 may contain three or more messaging windows. In further embodiments, the user interface 300 may include one or more messaging windows in a minimized state such that the full messaging window is not displayed.

Figure 3A:
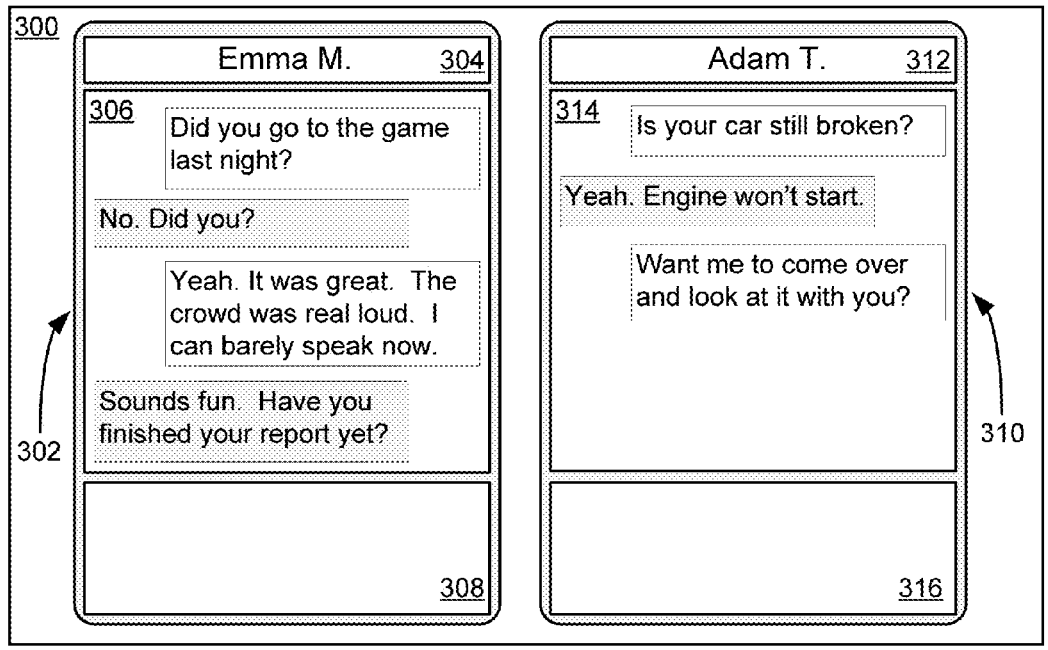
FIG. 3A is a diagram illustrating one embodiment of a user interface for messaging device that indicates a message recipient.

FIG. 3A depicts the user interface 300 where the user has recently received a message from the first correspondent (i.e., "Emma M."), displayed in the first conversation pane 306 and has recently sent a message to the second correspondent (i.e., "Adam T."), now displayed in the second conversation pane 314. At this point the user directs his/her attention to the first messaging window 302.

The messaging device may detect the user's attention, for example, by detecting that a viewing location (corresponding to the user's gaze), a touch location, and/or a cursor location coincides with the first messaging window 302. In some embodiments, the act of viewing, touching, and/or clicking on the first messaging window 302 causes the first messaging window 302 to become the active messaging window (e.g., the top messaging window). Accordingly, the message device identifies the first messaging window 302 as the active messaging window.

Figure 3B:
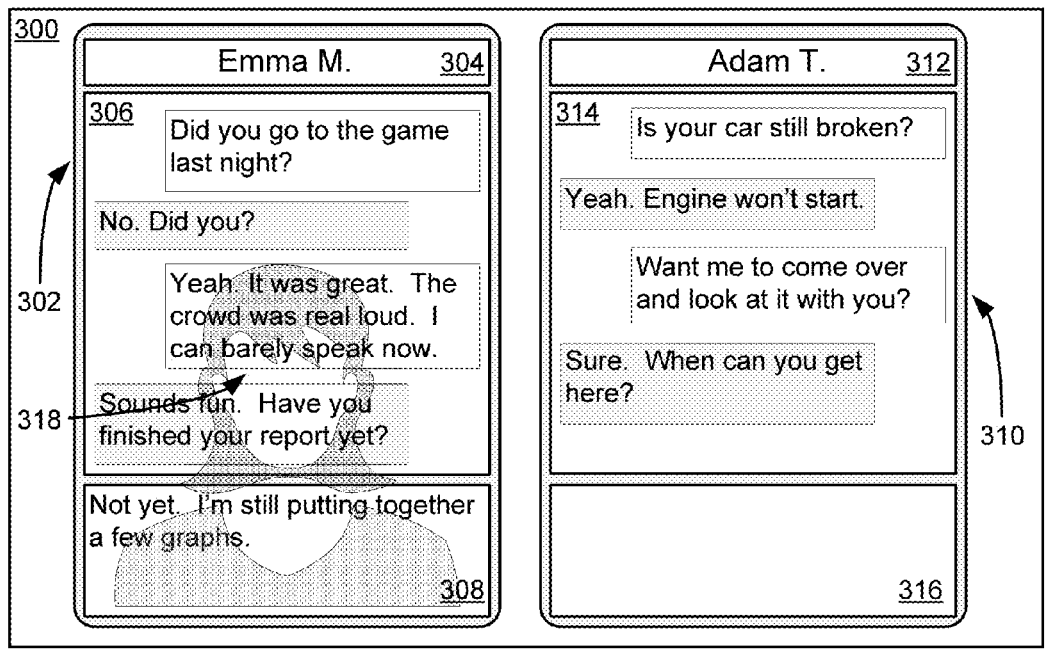
FIG. 3B is a diagram illustrating another embodiment of the user interface of FIG. 3A.

FIG. 3B depicts the user interface 300 where the message device has identified a correspondent associated with the active messaging window (i.e., the first messaging window 302) and has displayed a first message recipient cue 318 in the first messaging window 302, the first message recipient cue 318 based on the first correspondent (i.e., "Emma M."). As depicted, the first message recipient cue 318 is an image (e.g., a photograph) of the correspondent (i.e., "Emma M."). In the depicted embodiment, the first message recipient cue 318 is located in the first conversation pane 306 and the first message composition pane 308. In some embodiments, the first message recipient cue 318 may be located entirely in the first message composition pane 308. Although the name of the first correspondent is shown in the first correspondent pane 304, a user may begin typing in the first message composition pane 308 without looking at the first correspondent pane 304 to verify the identity of the correspondent. Accordingly, displaying the first message recipient cue 318 in the first messaging window 302 prevents the user from accidentally sending a message to the wrong correspondent.

In some embodiments, the first message recipient cue 318 is a temporary (e.g., transient) cue that persists for a time (e.g., a second or two) and then disappears from the messaging interface. As depicted in FIG. 3B, the first message recipient cue 318 may be a translucent identifier of the correspondent (i.e., "Emma M.") having a transparency value allowing the user to view the messages in the first conversation pane 306 and/or first message composition pane 308 through the first message recipient cue 318. For example, the first message recipient cue 318 may be a watermark displayed in the background of the first messaging window 302. In some embodiments, the messaging device may modify a characteristic of the text in the first conversation pane 306 and/or first message composition pane 308 to make the text more visible against the first message recipient cue 318.

FIG. 3B further depicts that the user has recently received a message from the second correspondent (i.e., "Adam T."), now displayed in the second conversation pane 314. At this point the user directs his/her attention to the second messaging window 310. As before, the messaging device may detect the user's attention by detecting that a viewing location (corresponding to the user's gaze), a touch location, and/or a cursor location coincides with the second messaging window 310. In some embodiments, the act of viewing, touching, and/or clicking on the second messaging window 310 causes the second messaging window 310 to become the active messaging window (e.g., the top messaging window). Accordingly, the message device now identifies the second messaging window 310 as the active messaging window.

Figure 3C:
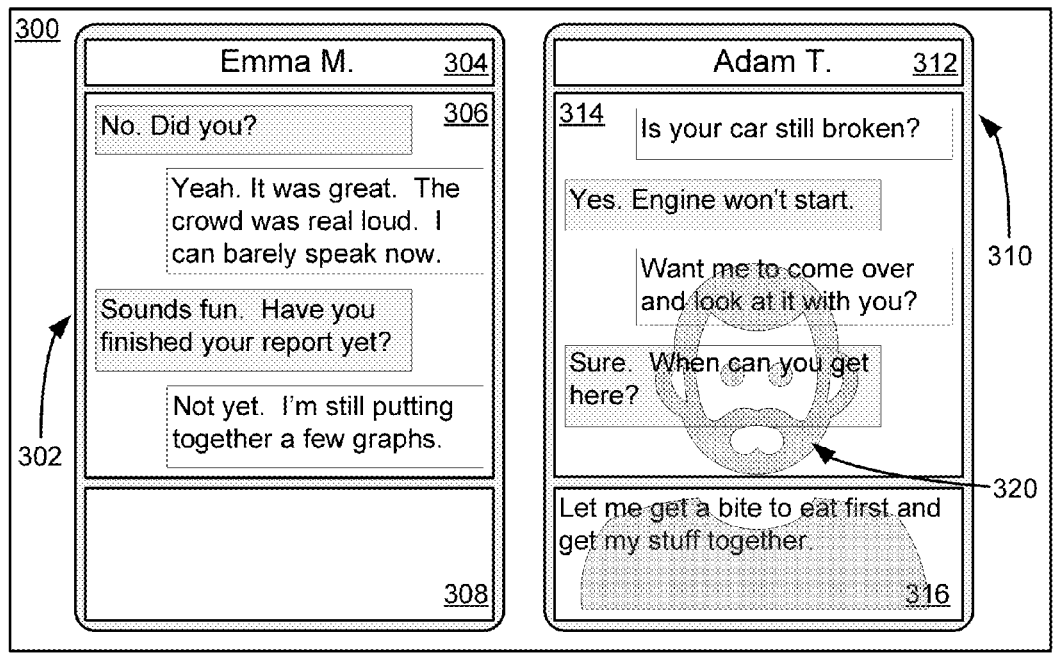
FIG. 3C is a diagram illustrating another embodiment of the user interface of FIG. 3A.

FIG. 3C depicts the user interface 300 where the message device has removed the first message recipient cue 318 from the first messaging window 302 and has further identified a correspondent associated with the active messaging window (i.e., the second messaging window 310) and has displayed a second message recipient cue 320 in the second messaging window 310, the second message recipient cue 320 based on the second correspondent (i.e., "Adam T.").

The messaging device removes the first message recipient cue 318, for example, responsive to expiration of a predetermined interval or to a user command. The predetermined interval may initiate in response to the message device displaying the first message recipient cue 318. In some embodiments, the user command may include the user selecting a "close" button of the message recipient cue. In some embodiments, the message device may removing the first message recipient cue 318 in response to user command or expiration of the predetermined interval, whichever occurs first.

As depicted, the second message recipient cue 320 may be an image (e.g., a photograph) of the correspondent (i.e., "Adam T."). In the depicted embodiment, the second message recipient cue 320 is located in the second conversation pane 314 and the second message composition pane 316. In other embodiments, the second message recipient cue 320 may be located entirely in the second message composition pane 316. Although the name of the second correspondent is shown in the second correspondent pane 312, a user may begin typing in the second message composition pane 316 without looking at the second correspondent pane 312 to verify the identity of the correspondent. Accordingly, displaying the second message recipient cue 320 in the second messaging window 310 prevents the user from accidentally sending a message to the wrong correspondent.

In some embodiments, the second message recipient cue 320 is a temporary (e.g., transient) cue that persists for a time (e.g., a second or two) and then disappears from the messaging interface. As depicted in FIG. 3C, the second message recipient cue 320 may be a translucent identifier of the correspondent (i.e., "Adam T.") having a transparency value allowing the user to view the messages in the second conversation pane 314 and/or second message composition pane 316 through the second message recipient cue 320. For example, the second message recipient cue 320 may be a watermark displayed in the background of the second messaging window 310. In some embodiments, the messaging device may modify a characteristic of the text in the second conversation pane 314 and/or second message composition pane 316 to make the text more visible against the second message recipient cue 320.

Figure 3D:
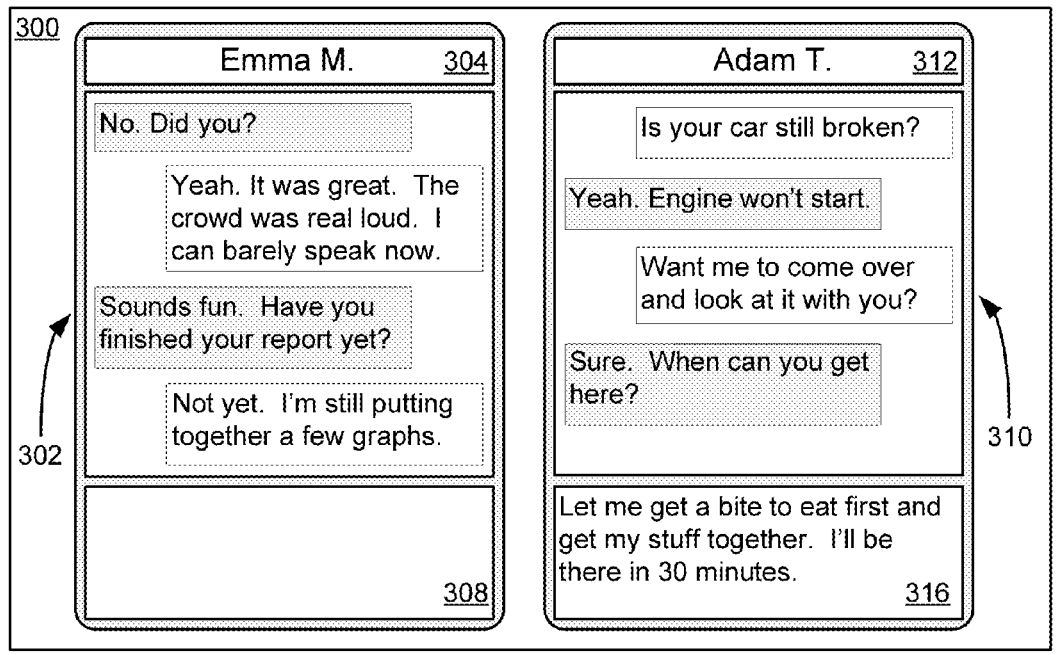
FIG. 3D is a diagram illustrating another embodiment of the user interface of FIG. 3A.

FIG. 3D depicts the user interface 300 where the message device has removed the second message recipient cue 320 from the second messaging window 310. The messaging device removes the second message recipient cue 320, for example, responsive to expiration of a predetermined interval or to a user command. The predetermined interval may initiate in response to the message device displaying the second message recipient cue 320. In some embodiments, the user command may include the user selecting a "close" button of the message recipient cue. In some embodiments, the message device may removing the second message recipient cue 320 in response to user command or expiration of the predetermined interval, whichever occurs first.

Figure 4:
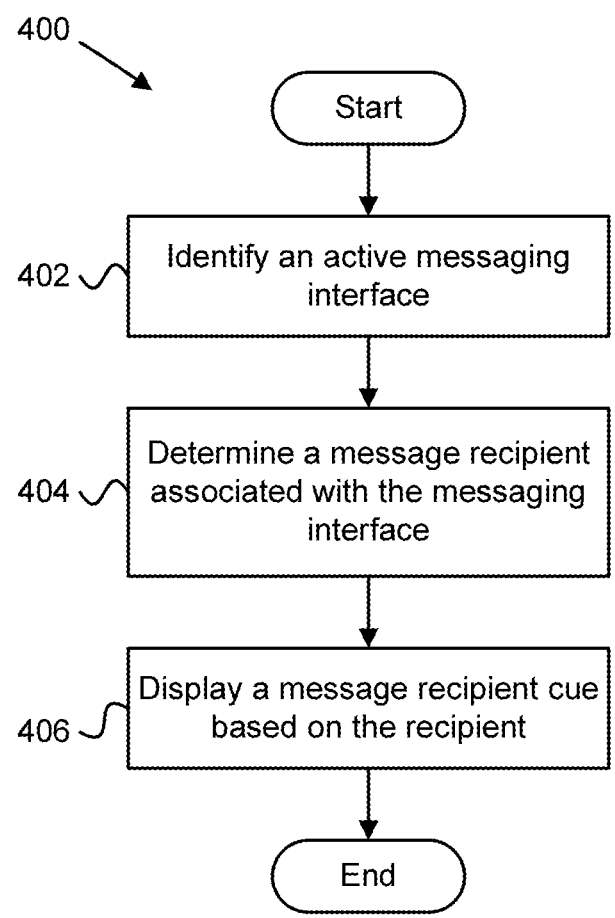
FIG. 4 is a schematic flow chart diagram illustrating one embodiment of a method for indicating a message recipient.

FIG. 4 depicts a method 400 for indicating a message recipient, according to embodiments of the disclosure. In some embodiments, the method 400 is performed using a messaging device, such as the messaging device 110, the correspondent indicator module 118, and/or the message recipient indicator module 200 described above with reference to FIGS. 1-2. In some embodiments, the method 400 is performed by a processor executing program code, for example, a microcontroller, a microprocessor, a central processing unit (CPU), a graphics processing unit (GPU), an auxiliary processing unit, a FPGA, or the like.

The method 400 begins and the messaging device identifies 402 an active messaging interface. In some embodiments, the active messaging window is identifies 402 from among a plurality of messaging interfaces. In some embodiments, the messaging device identifies 402 the active messaging interface based on where the user's attention is directed. For example, identifying 402 the active messaging interface may include determining one or more of a cursor location, a viewing location, a touch location, and a typing location. In some embodiments, identifying 402 the active messaging interface may include identifying when the user switches from a first messaging interface to a second messaging interface, the second messaging interface becoming the active messaging interface.

The messaging device then determines 404 a message recipient associated with the active messaging interface. The message recipient may include user of a correspondent node which communicates with the messaging device via the active messaging interface. In some embodiments, the message recipient is an individual, while in other embodiments the message recipient may be a group (i.e., a plurality of individuals with whom the user is conversing using a single messaging window).

Next, the messaging device displays 406 a message recipient cue based on the determined message recipient. In some embodiments, the message recipient cue is a temporary (e.g., transient) cue that persists for a time (e.g., a second or two) and then disappears from the messaging interface. In some embodiments, displaying 406 the message recipient cue includes displaying the message recipient cue with an initial transparency value (e.g., a first transparency level) and increasing the transparency over time (e.g., at regular intervals) until a final transparency value (e.g., a second transparency level) is reached.

In some embodiments, displaying 406 the message recipient cue includes removing the message recipient cue in response to expiration of a predetermined interval. The predetermined interval may initiate in response to displaying 406 the message recipient cue. For example, a timer may begin to count down when the message recipient cue is displayed, wherein the messaging device removes the message recipient cue when the timer reaches zero. In certain embodiments, the predetermined interval is user adjustable. In some embodiments, displaying 406 the message recipient cue includes removing the message recipient cue in response to a user command or indication. For example, the user may select a "close" button of the message recipient cue, wherein the messaging device removes the message recipient cue responsive to the user selection. In further embodiments, displaying 406 the message recipient cue includes removing the message recipient cue in response to user indication and before expiration of the predetermined interval.

In some embodiments, the message recipient cue is a translucent identifier of the message recipient. The identifier may be a visual indicator of a recipient associated with the active messaging interface, including one or more of a name of the recipient (e.g., a screen name, username, or personal name), an image of the recipient (e.g., a photograph), an avatar of the recipient, and an address of the recipient (e.g., an email address or a phone number). Being translucent, the message recipient cue may have a transparency value allowing the user to view the text through the message recipient cue so as to not block the content (e.g., text) of the message. For example, the message recipient cue may be a watermark displayed in the background of the messaging interface. In some embodiments, displaying 406 the message recipient cue includes modifying a characteristic of the text in the messaging interface in response to displaying the message recipient cue. For example, the color, size, and/or typeset of the text may be adjusted to make it more visible (e.g., high contrast) against the translucent identifier.

In some embodiments, displaying 406 the message recipient cue includes retrieving a visual identifier based on the determined message recipient. Examples of the visual identifier include, but are not limited to, a photograph of the determined message recipient, an avatar associated with the determined message recipient, an icon or an image associated with the determined message recipient, a text construct that represents the determined message recipient (e.g., an image of the message recipient's name), and the like. The method 400 ends.

Figure 5:
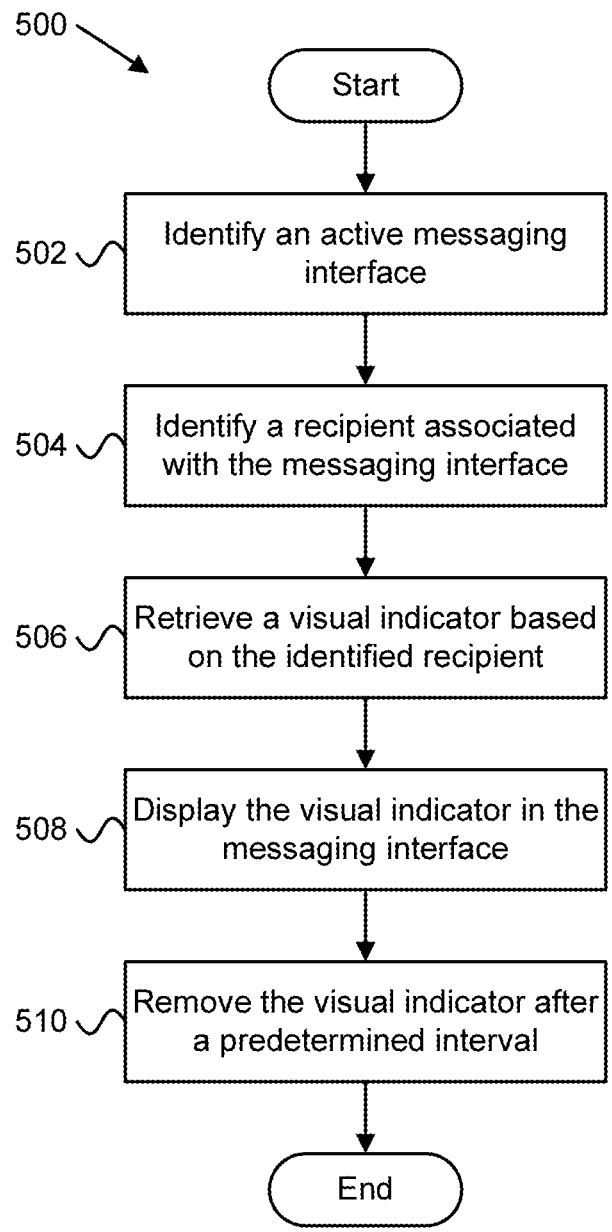
FIG. 5 is a schematic flow chart diagram illustrating another embodiment of a method for indicating a message recipient.

FIG. 5 depicts a method 500 for indicating a message recipient, according to embodiments of the disclosure. In some embodiments, the method 500 is performed using a messaging device, such as the messaging device 110, the correspondent indicator module 118, and/or the message recipient indicator module 200 described above with reference to FIGS. 1-2. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins and the messaging device identifies 502 an active messaging interface. In some embodiments, the active messaging window is identifies 502 from among a plurality of messaging interfaces. In some embodiments, the messaging device identifies 502 the active messaging interface based on where the user's attention is directed. For example, identifying 502 the active messaging interface may include determining one or more of a cursor location, a viewing location, a touch location, and a typing location. In some embodiments, identifying 502 the active messaging interface may include identifying when the user switches from a first messaging interface to a second messaging interface, the second messaging interface becoming the active messaging interface.

The messaging device then identifies 504 a recipient associated with the active messaging interface. The recipient may include user of a correspondent node which communicates with the messaging device via the active messaging interface. In some embodiments, the recipient is an individual, while in other embodiments the message recipient may be a group (i.e., a plurality of individuals with whom the user is conversing using a single messaging window). In some embodiments, identifying 504 the recipient includes obtaining an address or username for a correspondent node communicating with the messaging device via the active messaging interface and comparing the address or username to a contacts database.

Next, the messaging device retrieves 506 a visual indicator based on the identified recipient, the visual indicator visually identifying the recipient to a user of the messaging device. Examples of the visual indicator include, but are not limited to, a photograph of the determined message recipient, an avatar associated with the determined message recipient, an icon or an image associated with the determined message recipient, a text construct that represents the determined message recipient (e.g., an image of the message recipient's name), and the like.

In some embodiments, retrieving 506 the visual indicator includes retrieving a visual indicator from the user's contacts (e.g., email contact list, phone contact list, "buddy" list, or friend list), the contacts being stored locally or on a remote storage device (e.g., a messaging server). In some embodiments, retrieving 506 the visual indicator includes receiving the visual indicator from the identified recipient. For example, the recipient's messaging client may communicate the visual indicator along with other identifiers of the correspondent.

In some embodiments, retrieving 506 the visual indicator includes retrieving the visual indicator from a server associated with the identified correspondent, for example a messaging server used by the identified correspondent. In certain embodiments, retrieving 506 the visual indicator includes retrieving the visual indicator from a local data storage device, such as a primary memory device (e.g., a RAM memory) or a secondary storage device (e.g., a flash drive or disc drive). In further embodiments, the visual indicator may loaded into memory when the messaging interface is first opened retrieving 506 the visual indicator includes retrieving the pre-loaded visual identifier from memory.

The messaging device then displays 508 the visual indicator in the messaging interface. In some embodiments, displaying 508 the visual indicator includes identifying a point of gaze (e.g., a viewing location) of a user, wherein the visual indicator is displayed at a location on the messaging interface based on the point of gaze. The visual indicator may be a translucent identifier selected from the group consisting of a name, a photograph, an avatar, and an address. Being translucent, the visual indicator may have a transparency value allowing the user to view the text through the visual indicator so as to not block the content (e.g., text) of the message. In some embodiments, displaying 508 the visual indicator includes displaying the visual indicator with an initial transparency value (e.g., a first transparency level) and increasing the transparency over time (e.g., at regular intervals) until a final transparency value (e.g., a second transparency level) is reached. In some embodiments, displaying 508 the visual indicator includes modifying a characteristic of the text in the messaging interface in response to displaying the visual indicator. For example, the color, size, and/or typeset of the text may be adjusted to make it more visible (e.g., high contrast) against the visual indicator.

Next, the messaging device removes 510 the visual indicator after a predetermined interval. The predetermined interval may initiate in response to displaying 406 the visual indicator. For example, a timer may begin to count down upon displaying 508 the visual indicator is displayed, wherein the messaging device removes 510 the visual indicator when the timer reaches zero. In certain embodiments, the predetermined interval is user adjustable. In some embodiments, removing 510 the visual indicator includes removing the visual indicator in response to a user command received before expiration of the predetermined interval. For example, the user may select a "close" button associated with the visual indicator, wherein removing 510 the visual indicator is in response to the user selection. The method 500 ends.

Figure 6:
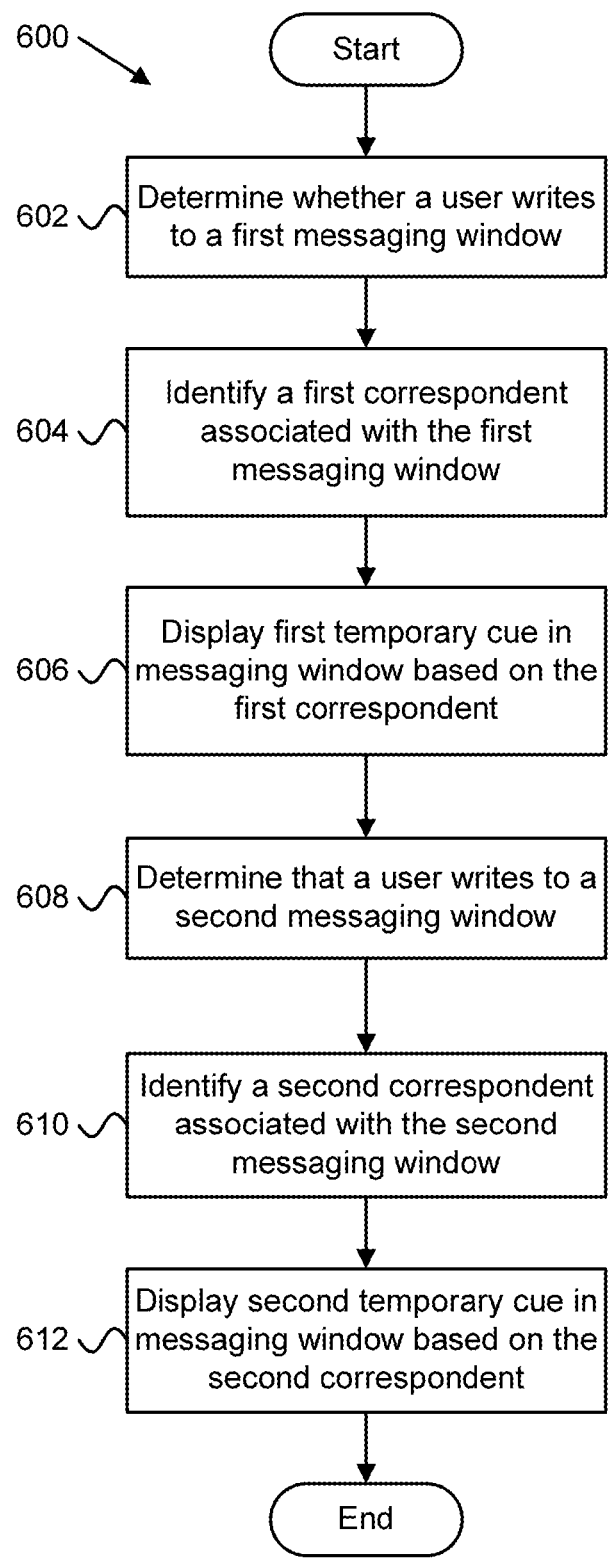
FIG. 6 is a schematic flow chart diagram illustrating another embodiment of a method for indicating a message recipient.

FIG. 6 depicts a method 600 for indicating a message recipient, according to embodiments of the disclosure. In some embodiments, the method 600 is performed using a messaging device, such as the messaging device 110, the correspondent indicator module 118, and/or the message recipient indicator module 200 described above with reference to FIGS. 1-2. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins and the messaging device determines 602 whether a user writes to a first messaging window. In some embodiments, the first messaging window is an active messaging window among a plurality of messaging windows. The messaging device then identifies 604 a first correspondent associated with the first messaging interface. In some embodiments, identifying 604 the first correspondent includes obtaining an address or username for a first correspondent node communicating with the messaging device via the first messaging interface, the first correspondent being a user of a first correspondent node.

Next, the messaging device displays 606 a first temporary cue in the first messaging window, the first temporary cue based on the first correspondent. In some embodiments, the first temporary cue is displayed 606 at a viewing location in the first messaging window, the first temporary cue persisting for a time (e.g., a second or two) and then disappears from the messaging interface. In some embodiments, displaying 606 the first temporary cue includes displaying a visual identifier with an initial transparency value (e.g., a first transparency level) and increasing the transparency over time (e.g., at regular intervals) until a final transparency value (e.g., a second transparency level) is reached.

In some embodiments, displaying 606 the first temporary cue includes removing the first temporary cue in response to expiration of a predetermined interval. The predetermined interval may initiate in response to displaying 606 the first temporary cue. For example, a timer may begin to count down when the first temporary cue is displayed, wherein the messaging device removes the first temporary cue when the timer reaches zero. In some embodiments, displaying 606 the first temporary cue includes removing the first temporary cue in response to a user command or indication. For example, the user may select a "close" button associated with the first temporary cue, wherein the messaging device removes the first temporary cue responsive to the user selection. In further embodiments, displaying 606 the first temporary cue includes removing the first temporary cue in response to user indication and before expiration of the predetermined interval.

In some embodiments, the first temporary cue is a translucent identifier of the message recipient. The identifier may be a visual indicator of a recipient associated with the active messaging interface, including one or more of a name of the recipient (e.g., a screen name, username, or personal name), an image of the recipient (e.g., a photograph), an avatar of the recipient, and an address of the recipient (e.g., an email address or a phone number). Being translucent, the first temporary cue may have a transparency value allowing the user to view the text through the first temporary cue so as to not block the content (e.g., text) of the message. For example, the first temporary cue may be a watermark displayed in the background of the messaging interface. In some embodiments, displaying 606 the first temporary cue includes modifying a characteristic of the text in the messaging interface in response to displaying the first temporary cue. For example, the color, size, and/or typeset of the text may be adjusted to make it more visible (e.g., high contrast) against the translucent identifier.

The messaging device then determines 608 that the user writes to a second messaging window. In some embodiments, the second messaging window is an active messaging window among a plurality of messaging windows. The messaging device then identifies 610 a second correspondent associated with the second messaging interface. In some embodiments, identifying 610 the second correspondent includes obtaining an address or username for a second correspondent node communicating with the messaging device via the second messaging interface, the second correspondent being a user of a second correspondent node.

Next, the messaging device displays 612 a second temporary cue in the second messaging window, the second temporary cue based on the second correspondent. In some embodiments, the second temporary cue is displayed 606 at a viewing location in the second messaging window, the second temporary cue persisting for a time (e.g., a second or two) and then disappears from the messaging interface. In some embodiments, displaying 612 the second temporary cue includes displaying a visual identifier with an initial transparency value (e.g., a first transparency level) and increasing the transparency over time (e.g., at regular intervals) until a final transparency value (e.g., a second transparency level) is reached.

In some embodiments, displaying 612 the second temporary cue includes removing the second temporary cue in response to expiration of a predetermined interval. The predetermined interval may initiate in response to displaying 612 the second temporary cue. For example, a timer may begin to count down when the second temporary cue is displayed, wherein the messaging device removes the second temporary cue when the timer reaches zero. In some embodiments, displaying 612 the second temporary cue includes removing the second temporary cue in response to a user command or indication. For example, the user may select a "close" button associated with the second temporary cue, wherein the messaging device removes the second temporary cue responsive to the user selection. In further embodiments, displaying 612 the second temporary cue includes removing the second temporary cue in response to user indication and before expiration of the predetermined interval.

In some embodiments, the second temporary cue is a translucent identifier of the message recipient. The identifier may be a visual indicator of a recipient associated with the active messaging interface, including one or more of a name of the recipient (e.g., a screen name, username, or personal name), an image of the recipient (e.g., a photograph), an avatar of the recipient, and an address of the recipient (e.g., an email address or a phone number). Being translucent, the second temporary cue may have a transparency value allowing the user to view the text through the second temporary cue so as to not block the content (e.g., text) of the message. For example, the second temporary cue may be a watermark displayed in the background of the messaging interface. In some embodiments, displaying 612 the second temporary cue includes modifying a characteristic of the text in the messaging interface in response to displaying the second temporary cue. For example, the color, size, and/or typeset of the text may be adjusted to make it more visible (e.g., high contrast) against the translucent identifier. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   provide a plurality of open messaging interfaces;
   identify a first messaging interface to which a user is currently paying attention from the plurality of open messaging interfaces;
   identify a correspondent associated with the first messaging interface; and
   provide a visual message recipient cue within the first messaging interface predetermined interval in response to the user writing to the first messaging interface, wherein the visual message recipient cue is based on the identified correspondent,
   wherein providing the visual message recipient cue comprises displaying the visual message recipient cue for a predetermined interval and then removing the visual message recipient cue from the first messaging interface,
   wherein the visual message recipient cue is superimposed on content in a message composition pane of the first messaging window that corresponds to the user writing without blocking the content.

2. The apparatus of claim 1, wherein the processor further receives a visual identifier from the correspondent, wherein the visual message recipient cue comprises the visual identifier.

3. The apparatus of claim 1, wherein the processor further retrieves a visual identifier from a server associated with the correspondent, wherein the visual message recipient cue comprises the visual identifier.

4. The apparatus of claim 1, wherein the processor further prompts the user to locate a visual identifier associated with the correspondent, wherein the visual message recipient cue comprises the visual identifier.

5. The apparatus of claim 1, wherein the processor further tracks eye movement of the user, wherein the processor identifies the first messaging interface based on the eye movement.

6. The apparatus of claim 5, wherein providing the visual message recipient cue comprises displaying the visual message recipient cue at a viewing location based on the eye movement.

7. The apparatus of claim 1, wherein the processor further:
   flags the first messaging interface in response to providing the visual message recipient cue;
   unflags the first messaging interface in response to the user shifting attention to another interface; and
   provides the visual message recipient cue in response to unflagging the first messaging interface.

8. The apparatus of claim 1, wherein identifying the first messaging interface comprises identifying a messaging window corresponding to a cursor location.

9. The apparatus of claim 1, wherein the visual message recipient cue is a translucent identifier selected from the group consisting of a name, a photograph, an avatar, and an address.

10. A method comprising:
providing a plurality of open messaging interfaces;
identifying, by use of a processor, a first messaging interface to which a user is currently paying attention from the plurality of open messaging interfaces;
displaying a visual indicator in response to the user directing attention to the active message interface, the visual indicator identifying a recipient associated with the first messaging interface, wherein the visual indicator is superimposed on content in a message composition pane of the first messaging window that corresponds to the user writing without blocking the content; and
removing the visual indicator from the first messaging interface in response to expiration of a predetermined interval.

11. The method of claim 10, further comprising:
identifying the recipient associated with the message; and
retrieving a visual indicator based on the identified recipient.

12. The method of claim 11, wherein retrieving the visual indicator comprises retrieving the visual indicator from a source selected from the group consisting of a local database, a server, and the identified recipient.

13. The method of claim 10, further comprising identifying a point of gaze of a user, wherein the visual indicator is displayed at a location on the messaging interface based on the point of gaze.

14. The method of claim 10, wherein the first messaging interface is a messaging interface to which a user is writing, the method further comprising:
determining whether the user writes to a second messaging interface;
identifying a second recipient associated with the second messaging interface;
providing a second visual indicator in the second messaging interface; and
removing the second visual indicator in response to expiration of the predetermined interval.

15. The method of claim 10, wherein identifying the first messaging interface comprises determining a messaging interface to which a user is typing.

16. The method of claim 10, further comprising removing the visual indicator in response to user indication and before expiration of the predetermined interval.

17. The method of claim 10, wherein the visual indicator is a translucent identifier selected from the group consisting of a name, a photograph, an avatar, and an address.

18. A program product comprising a computer readable storage medium that stores code executable by a processor, the executable code comprising code to perform:
providing a plurality of open messaging interfaces;
determining whether a user writes to a particular messaging window from the plurality of open messaging interfaces;
identifying a correspondent associated with the particular messaging window;
providing a visual message recipient cue within the particular messaging window in response to the user writing to the particular messaging window, the visual message recipient cue being based on the identified correspondent, wherein the visual message recipient cue is provided at an area of the particular messaging window where message text is entered,
wherein the visual message recipient cue is superimposed on content in a message composition pane of the first messaging window that corresponds to the user writing without blocking the content; and
removing the visual message recipient cue from the first messaging interface in response to expiration of a predetermined interval.

* * * * *